United States Patent
Sano et al.

(10) Patent No.: US 8,896,164 B2
(45) Date of Patent: Nov. 25, 2014

(54) PERMANENT-MAGNET STEPPING MOTOR

(71) Applicant: Minebea Motor Manufacturing Corporation, Tokyo (JP)

(72) Inventors: Hiroshi Sano, Tokyo (JP); Taketoshi Ohyashiki, Tokyo (JP); Makoto Kinoshita, Tokyo (JP); Katsutoshi Suzuki, Tokyo (JP); Osamu Nakamura, Tokyo (JP)

(73) Assignee: Minebea Co., Ltd., Kitasaku-gun (JP)

( * ) Notice: Subject to any disclaimer, the term of this patent is extended or adjusted under 35 U.S.C. 154(b) by 116 days.

(21) Appl. No.: 13/650,833

(22) Filed: Oct. 12, 2012

(65) Prior Publication Data
US 2013/0093268 A1 Apr. 18, 2013

(30) Foreign Application Priority Data
Oct. 18, 2011 (JP) .................................. 2011-228502

(51) Int. Cl.
*H02K 37/14* (2006.01)
*H02K 1/02* (2006.01)

(52) U.S. Cl.
CPC ............ *H02K 37/14* (2013.01); *H02K 2213/03* (2013.01); *H02K 1/02* (2013.01)
USPC .................. 310/49.53; 310/156.71

(58) Field of Classification Search
CPC ........ H02K 1/243; H02K 21/00; H02K 41/03
USPC ............ 310/49.15–49.17, 49.22–49.24, 310/49.36–49.38, 49.44–49.46, 49.53, 310/156.71–156.73, 156.66, 257, 263
See application file for complete search history.

(56) References Cited

U.S. PATENT DOCUMENTS

| | | | |
|---|---|---|---|
| 4,347,457 A * | 8/1982 | Sakamoto ..................... 310/256 |
| 4,841,189 A * | 6/1989 | Cooper et al. ................ 310/257 |
| 6,822,351 B2 * | 11/2004 | Matsushita et al. ........ 310/49.36 |
| 6,873,068 B2 * | 3/2005 | Nishimura ................ 310/49.36 |
| 7,635,931 B2 * | 12/2009 | Suzuki et al. .............. 310/49.37 |

FOREIGN PATENT DOCUMENTS

JP A-06-105526 4/1994

\* cited by examiner

*Primary Examiner* — Quyen Leung
*Assistant Examiner* — Naishadh Desai
(74) *Attorney, Agent, or Firm* — Oliff PLC

(57) ABSTRACT

A stepping motor uses a low-cost ferrite magnet instead of an expensive rare-earth magnet. The stepping motor has characteristics equivalent or superior to those of a conventional stepping motor. The stepping motor is provided with a rotor 300, a stator yoke 200, and bearings 501 and 502 which rotatably hold the rotor 300 with respect to the stator yoke 200. The rotor 300 has a columnar shape and has plural magnetic poles arranged in the circumferential direction of the outer circumferential surface. The stator yoke 200 has an outer cylindrical portion and an inner circumferential portion which surrounds the rotor 300 and which has plural first pole teeth and plural second pole teeth. The outer diameter "d" of the rotor 300 and the outer diameter "D" of the stator yoke 200 are set so that the ratio of "d/D" is greater than 0.6.

2 Claims, 2 Drawing Sheets

PERMANENT-MAGNET STEPPING MOTOR

BACKGROUND OF THE INVENTION

1. Field of the Invention

The present invention relates to a permanent-magnet (PM) stepping motor characterized by the relationship between a magnet diameter of a rotor and an outer diameter of a stator yoke.

2. Description of Related Art

A permanent-magnet (PM) stepping motor is disclosed in Japanese Patent Application Laid-open No. 6-105526. This PM stepping motor is a claw-pole stepping motor. This PM stepping motor includes a first stator and a second stator which has the same structure as that of the first stator. The first stator is constructed such that a bobbin is wound with coils and is contained in a combined structure of an outside yoke and an inside yoke. The first stator and the second stator are stacked in an axial direction, thereby forming a stator. The stator surrounds a rotor which is rotatable with respect to the stator. The rotor is constructed with a shaft, a rotor sleeve, and magnets (permanent magnets) formed by magnetizing plural portions at the outer circumference thereof. According to the invention disclosed in Japanese Patent Application Laid-open No. 6-105526, the outer diameter "d" of the magnet of the rotor and the outer diameter "D" of the stator yoke is set so that the ratio of "d/D" is smaller than 0.4.

In a PM stepping motor having such a structure, rotation and stop are controlled by a relationship between magnetic force of the rotor magnet and magnetic force generated at the stator core by excitation. In this regard, balance of the magnetic force of the rotor magnet and the magnetic force generated at the stator core is an important design consideration. As the permanent magnet, a rare-earth magnet is generally used due to its high magnetic force, but a ferrite magnet is advantageous in view of material cost.

SUMMARY OF THE INVENTION

In view of these circumstances, it is an object of the present invention to provide a stepping motor in which a ferrite magnet of a low-cost material is used instead of a rare-earth magnet of an expensive material, but which has characteristics equivalent or superior to those of a conventional stepping motor.

According to a first aspect of the present invention, the present invention provides a permanent-magnet stepping motor including a rotor, a stator yoke, and a holding member which rotatably holds the rotor with respect to the stator yoke. The rotor has a columnar shape and includes plural magnetic poles arranged in the circumferential direction of an outer circumferential surface. The stator yoke has a cylindrical outer circumferential portion and an inner circumferential portion which surrounds the rotor and which has plural first pole teeth and plural second pole teeth. The first pole teeth extend in an axial direction, and the second pole teeth alternately engage with the first pole teeth with a gap therebetween. The rotor has an outer diameter "d" and the stator yoke has an outer diameter "D", and the ratio of "d/D" is greater than 0.6. According to the first aspect of the present invention, even when an inexpensive ferrite magnet is used for the rotor magnet, a PM stepping motor having superior performance to that of a PM stepping motor using a rare-earth magnet is obtained.

According to a second aspect of the present invention, in the first aspect of the present invention, the magnetic poles of the rotor may be constructed with a ferrite magnet.

According to a third aspect of the present invention, in the first or the second aspect of the present invention, the stator yoke may have an outer diameter of not more than 55 mm.

According to the present invention, a stepping motor having characteristics equivalent or superior to those of a conventional stepping motor is provided even when a ferrite magnet of a low-cost material is used instead of a rare-earth magnet of an expensive material.

BRIEF DESCRIPTION OF THE DRAWINGS

FIG. 1A is a sectional view and FIG. 1B is a front view.

PREFERRED EMBODIMENTS OF THE INVENTION

Structure

Figure 1A:
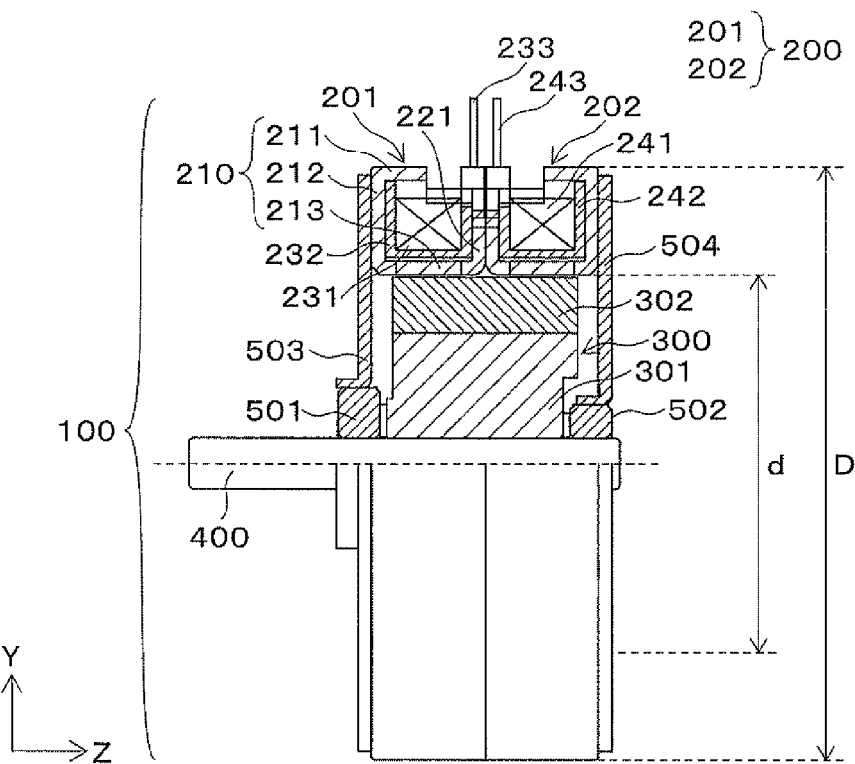
FIGS. 1A and 1B show a stepping motor of an embodiment of the present invention.
Figure 1B:
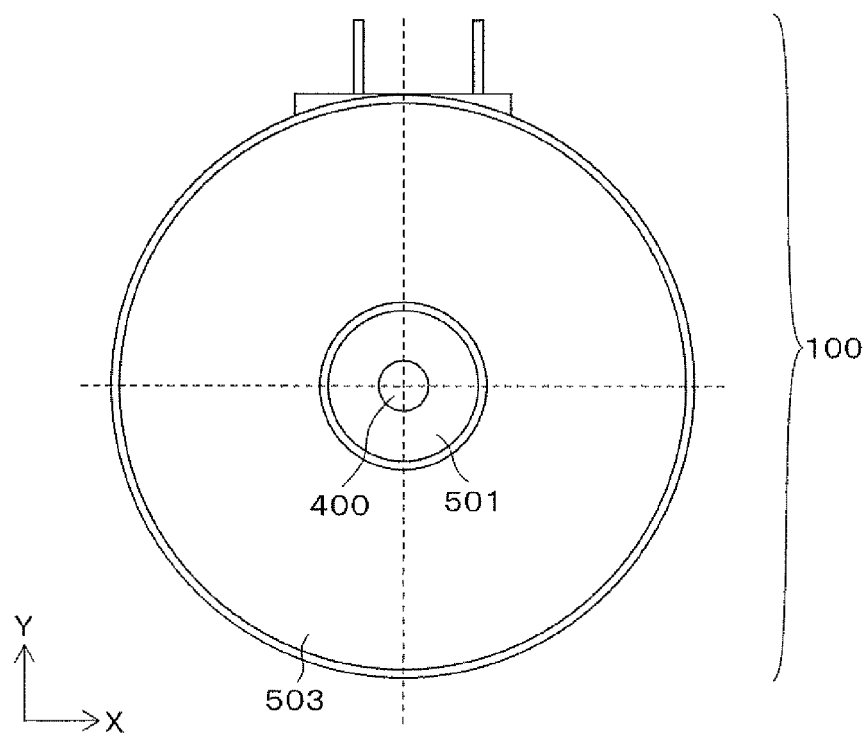

FIGS. 1A and 1B show a PM stepping motor 100 of an embodiment. FIG. 1A shows a cross section of the PM stepping motor 100 cut in the axial direction, and FIG. 1B shows an appearance of the PM stepping motor 100 viewed from the front. The PM stepping motor 100 is a claw-pole stepping motor. The PM stepping motor 100 is provided with a stator yoke 200. The stator yoke 200 is formed of a first stator yoke 201 and a second stator yoke 202. The first stator yoke 201 and the second stator yoke 202 have the same structure and are oppositely-arranged in the axial direction. The structure of the first stator yoke 201 will be described as an example of the stator yokes hereinafter.

Figure 2:
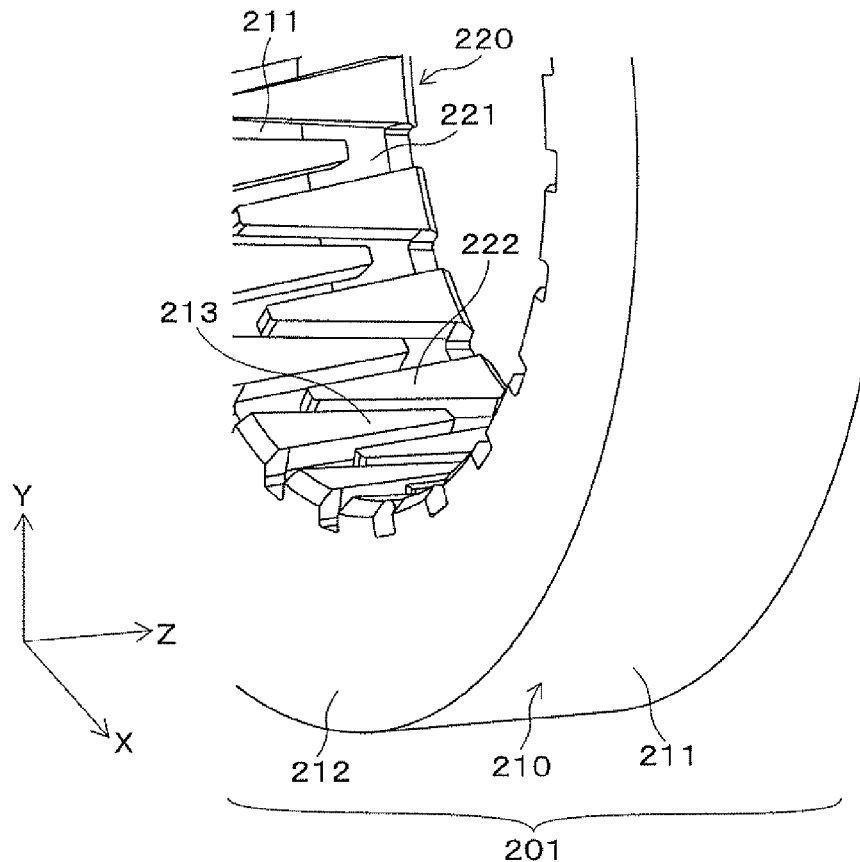
FIG. 2 is a perspective view of a first stator.

FIG. 2 is a perspective view of the first stator yoke 201. FIG. 2 shows only a part of the first stator yoke 201, and the other portions are omitted. The first stator yoke 201 is formed of an outside yoke 210 and an inside yoke 220 which are made of soft magnetic steel sheet (for example, a magnetic steel sheet or a silicon steel sheet). The outside yoke 210 has an outer cylindrical portion 211, a ring portion 212, and plural pole teeth 213. The outer cylindrical portion 211 forms the outer circumference of the first stator yoke 201. The ring portion 212 extends from an edge at an end portion in the axial direction of the outer cylindrical portion 211 to the center of the axis. The plural pole teeth 213 are bent in the axial direction on the side of the center of the axis of the ring portion 212.

The inside yoke 220 has a ring portion 221 and plural pole teeth 222 bent in the axial direction on the side of the center of the axis of the ring portion 221. An outer edge portion of the ring portion 221 is connected with the inside of the outer cylindrical portion 211. The outside yoke 210 and the inside yoke 220 are joined by this connecting structure. The pole teeth 213 of the outside yoke 210 and the pole teeth 222 of the inside yoke 220 extend in the opposite direction with respect to each other and alternately engage with each other with a gap therebetween. The area, at which the pole teeth 213 and 222 face each other by engaging with the gap therebetween, forms an inner circumference of the first stator yoke 201.

The first stator yoke 201 formed of the outside yoke 210 and the inside yoke 220 has a circular hollow portion inside thereof. A resin bobbin 232 wound with a field coil 231 is arranged in the circular hollow portion (see FIG. 1A). An end portion of a wire of the field coil 231 is connected to a terminal 233. The terminal 233 is made so as to be connected with a wire for supplying a drive signal from outside. Similar to the first stator yoke 201, the second stator yoke 202 also has a circular hollow portion, and a resin bobbin 242 wound with a field coil 241 is arranged in the hollow portion. The end portion of the wire of the field coil 241 is connected to a terminal 243. The stator yoke 200 is formed by stacking the first stator yoke 201 and the second stator yoke 202 in the axial direction. The first stator yoke 201 and the second stator yoke 202 are oppositely stacked in the axial direction.

The stator yoke 200 has an approximately columnar space at the center thereof, in which a rotor 300 is rotatably contained. The rotor 300 has a columnar shape overall and has a columnar core member 301 and a thick cylindrical rotor magnet 302 fixed at an outer circumference of the core member 301. A Shaft 400 which functions axis of rotation is fixed at the center of the core member 301. The rotor magnet 302 is a ferrite-type permanent magnet with a thick cylindrical shape and is magnetized so that the polarity is alternately changed in the circumferential direction. A ferrite magnet is used for the rotor magnet 302. The type of ferrite magnet includes a sintered magnet, a resin magnet, a polar anisotropic magnet, a radially oriented magnet, or an isotropic magnet.

The shaft 400 is rotatably held by bearings 501 and 502. The bearing 501 is fixed to a front plate 503 fixed to the first stator yoke 201. The bearing 502 is fixed to an end plate 504 fixed to the second stator yoke 202. According to this structure, the rotor 300 is rotatably held inside the stator yoke 200.

An outer diameter "D" of the first stator yoke 201 and an outer diameter "d" of the second stator yoke 202 are to satisfy that the ratio of "d/D" is greater than 0.6. The maximum value of "D" is 55 mm. By setting the ratio of "d/D" to be greater than 0.6, even when a ferrite magnet which has weaker magnetic force than that of a rare-earth magnet is used, superior performance is obtained compared with a case of using the rare-earth magnet. When a ferrite magnet is used for the rotor magnet 302, if the ratio of "d/D" is 0.6 or smaller, the performance tends to be inferior to the case of using the rare-earth magnet.

Performance Evaluation

Figure 3:
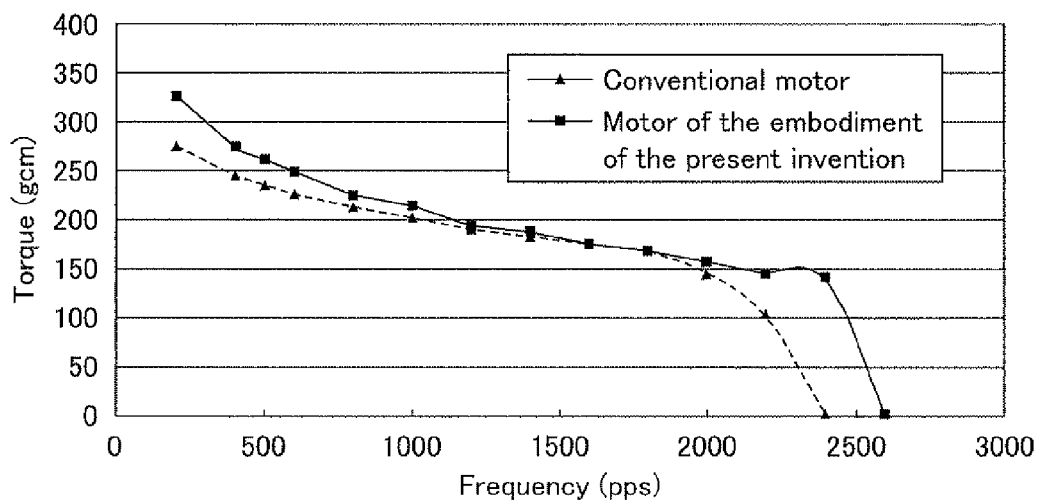
FIG. 3 is a graph that shows torque characteristics of an embodiment of the present invention and a conventional example.

FIG. 3 shows a result of a performance test performed on a motor using a rare-earth magnet as the rotor magnet (conventional motor) and on a motor of an embodiment of the present invention. A horizontal axis in FIG. 3 is a frequency of a drive signal (for switching the polarity of the field coil). The value of the horizontal axis can be understood as a parameter which is proportional to rotation speed. A vertical axis in FIG. 3 is torque.

The test samples for the data shown in FIG. 3 had the following conditions. Each of the test samples had a same size space between the stator and the rotor.

(Conventional Motor)
  Outer diameter "D" of a stator: 35 mm
  Outer diameter "d" of a rotor magnet: 18 mm
  Material of the rotor magnet: rare-earth bond magnet
  "d/D" was approximately 0.51
  Driving method: constant-current driving method
(Motor of an Embodiment of the Present Invention)
  Outer diameter "D" of a stator: 35 mm
  Outer diameter "d" of a rotor magnet: 22 mm
  Material of the rotor magnet: ferrite polar anisotropic magnet
  "d/D" was approximately 0.63
  Driving method: constant-current driving method As shown in FIG. 3, the sample of the motor of the embodiment of the present invention exhibited higher torques in the low drive frequency range and the high drive frequency range compared with the sample of the conventional motor. In particular, the torque was not easily decreased in the high drive frequency range.

As shown in FIG. 3, in the embodiment of the present invention, even when the ferrite magnet, which had weaker magnetic force than that of the rare-earth magnet, was used for the rotor magnet, the torque characteristic was not degraded compared with the conventional motor using the rare-earth magnet. This was because the surface area of the rotor was increased so as not to decrease the magnetic force applied between the stator and the rotor as a whole by increasing the diameter of the rotor.

The torque was high in the low drive frequency range in the motor of the embodiment of the present invention. In the motor of the embodiment of the present invention, the diameter of the rotor was large. Therefore, the magnetized pitch of the rotor was large, and the widths of the pole teeth of the stator (dimensions of the pole teeth 213 and 222 in the circumferential direction) were also correspondingly large. As a result, the torque was high during the low-speed rotation.

The torque was not easily decreased in the high drive frequency range in the constant-current driving because the winding numbers of the field coils 231 and 241 were decreased, and the impedances of the coils were decreased By setting the value of "d/D" to be large. Moreover, in the embodiment of the present invention, thinning the sheet of the stator yoke (for example, from a conventional thickness of 0.9 to 0.8 mm, or from 0.8 to 0.7 mm) made iron loss in the stator yoke 200 decrease. The iron loss increases with the increase of the drive frequency. In this regard, by reducing the effects of the iron loss, the torque characteristic in the high drive frequency range was superior to that of the conventional motor. Since the sheet thickness of the stator yoke was decreased, magnetic flux density was decreased. However, magnetic flux relating to the torque was not decreased because the magnetized pitch of the rotor was increased and the widths of the pole teeth of the stator facing the rotor were thereby increased. Thus, by setting the conditions so that the value of "D" was not more than 55 mm, the ratio of "d/D" was greater than 0.6, and the sheet thickness of the stator yoke was not more than 0.8 mm, the decrease of the torque in the high drive frequency range was prevented.

When the ferrite magnet is used for the rotor magnet 302, if the ratio of "d/D" is 0.6 or less, the performance of the motor is not superior to that of the conventional motor using the rare-earth magnet shown in FIG. 3. Then, the torque decreases in all drive frequency ranges due to the weak magnetic force of the rotor magnet 302. On the other hand, if a rare-earth magnet is used for the rotor magnet 302 and the ratio of "d/D" is greater than 0.6, the torque more easily decreases than that shown in FIG. 3 in the high drive frequency range.

Advantages

As shown in FIGS. 1A, 1B and 2, the motor of the embodiment of the present invention is provided with the rotor 300, the stator yoke 200, and the bearings 501 and 502 that rotatably hold the rotor 300 with respect to the stator yoke 200. The rotor 300 has a columnar shape and includes plural magnetic poles arranged in the circumferential direction of the outer circumferential surface. The stator yoke 200 has the outer cylindrical portion 211 and the inner circumferential portion which surrounds the rotor 300 and which has plural first pole teeth 213 and plural second pole teeth 222. The first pole teeth 213 extend in an axial direction. The second pole teeth 222 alternately engage with the first pole teeth 213 with a gap therebetween. The outer diameter "d" of the rotor 300 and the outer diameter "D" of the stator yoke 200 are set so that the ratio of "d/D" is greater than 0.6.

According to this structure, an inexpensive ferrite magnet can be used for the rotor magnet instead of an expensive rare-earth magnet, whereby the material cost is decreased without degrading the performance. By setting the ratio of "d/D" to be large, the amounts of the wires forming the field coils are reduced, which also decreases the material cost. Moreover, the magnetic flux density of the magnetic field generated by the filed coil can be decreased. Therefore, the thickness of the soft magnetic sheet material for the stator yoke 200 is decreased, whereby the weight is reduced, the machining accuracy is improved, and the material cost is reduced.

OTHER EXAMPLES

The embodiment of the present invention is not limited to each of the above embodiments and includes various modifications that may be anticipated by a person skilled in the art. In addition, the effects of the present invention are also not limited to the description above. That is, various additions, changes, and partial deletions can be made in a range that does not exceed the general concept and object of the present invention, which are derived from the descriptions recited in the Claims and equivalents thereof.

The present invention can be used for PM stepping motors having claw-pole structures.

What is claimed is:

1. A permanent-magnet stepping motor comprising:
a rotor having a columnar shape and including plural magnetic poles arranged in a circumferential direction of an outer circumferential surface;
a first stator yoke having a cylindrical outer circumferential portion and an inner circumferential portion which surrounds the rotor and which has plural first pole teeth and plural second pole teeth, the first pole teeth extending in an axial direction, and the second pole teeth alternately engaging with the first pole teeth with a gap therebetween, the first stator yoke including an outside yoke having a U-shaped cross section composed of the outer circumferential portion, the inner circumferential portion, and a ring-shaped portion provided between front edges of the outer circumferential portion and the inner circumferential portion, and an inside yoke provided between rear edges of the outer circumferential portion and the inner circumferential portion;
a second stator yoke having substantially the same structure as the first stator yoke and arranged coaxially and oppositely with the first stator yoke;
a first bearing and a second bearing rotatably holding the rotor with respect to the stator yoke;
a front plate for supporting the first bearing and fixed to the outside yoke of the first stator yoke; and
an end plate for supporting the second bearing and fixed to the outside yoke of the second stator yoke; wherein
the rotor has an outer diameter "d" and the stator yoke has an outer diameter "D", and the ratio of "d/D" is greater than 0.6,
the magnetic poles of the rotor are made of ferrite magnets, and
the stator yoke has an outer diameter of not more than 55 mm and a thickness of not more than 0.8 mm.

2. The permanent-magnet stepping motor according to claim 1, wherein
the rotor has a columnar core member, and a ferrite magnet fixed to an outer circumferential surface of the core,
the core has a recess at an end surface thereof facing the end plate, and
a portion of the second bearing is located in the recess.

* * * * *